Jan. 15, 1924. 1,481,053
L. M. EVANS
TIRE CLAMPING AND TURNING DEVICE
Filed July 2, 1921 2 Sheets-Sheet 1

L. M. Evans
INVENTOR.

BY
Mason Fenwick & Lawrence
ATTORNEYS

Jan. 15, 1924.
L. M. EVANS
1,481,053
TIRE CLAMPING AND TURNING DEVICE
Filed July 2, 1921    2 Sheets-Sheet 2
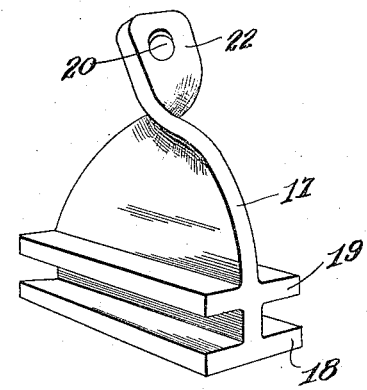
Fig. 5.
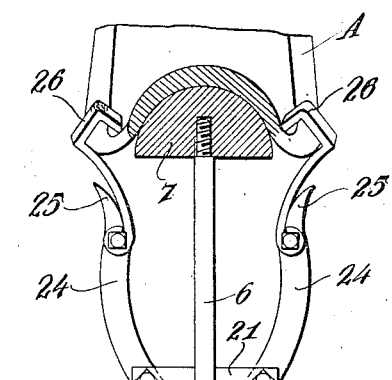
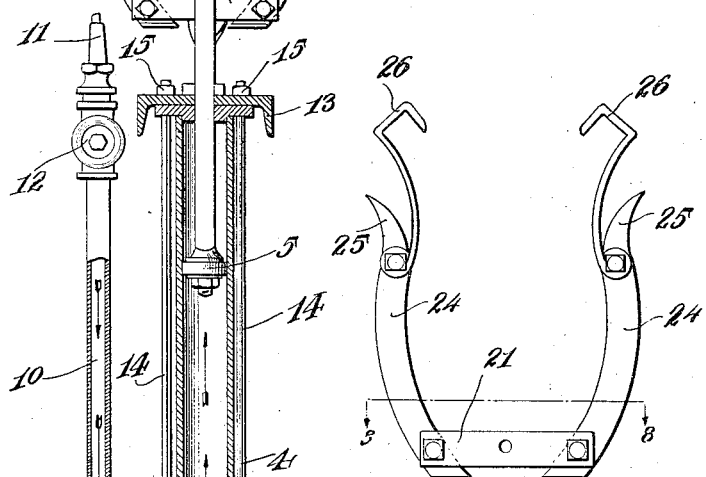
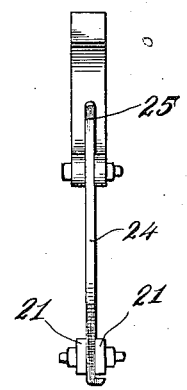
Fig. 6.    Fig. 7.
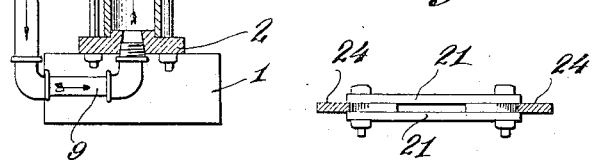
Fig. 4.    Fig. 8.
L. M. Evans
INVENTOR.
BY
Mason Fenwick & Lawrence
ATTORNEYS Patented Jan. 15, 1924.

1,481,053

UNITED STATES PATENT OFFICE.

LEO M. EVANS, OF SALT LAKE CITY, UTAH.

TIRE CLAMPING AND TURNING DEVICE.

Application filed July 2, 1921. Serial No. 482,184.

*To all whom it may concern:*

Be it known that I, LEO M. EVANS, a citizen of the United States, residing at Salt Lake City, in the county of Salt Lake and State of Utah, have invented certain new and useful Improvements in Tire Clamping and Turning Devices; and I do hereby declare the following to be a full, clear, and exact description of the invention, such as will enable others skilled in the art to which it appertains to make and use the same.

This invention relates to new and useful improvements in tire clamping and turning devices, the main object of the present invention being the provision of a device of the above character whereby an automobile tire casing can be readily clamped into position and turned inside out so that the interior of the casing can be inspected for defects or repaired.

Another object of the present invention is the provision of a tire clamping and turning device whereby tires of different sizes can be readily placed in position upon the device and turned inside out for the purpose of repairing the interior of the tire casing.

A further object of the invention is the provision of a tire clamping and turning device wherein the use of compressed air is utilized for operating a movable plunger head and detachable hook members disposed at right angles to the plunger head and adapted for ready engagement with the beading of a tire casing and is of such simple construction that the device can be readily moved from place to place.

With the above and other objects in view the invention consists in the novel features of construction, combination and arrangement of parts hereinafter more fully set forth, pointed out in the claims and shown in the accompanying drawings in which:

Fig. 4 is a vertical sectional view taken on the line 4—4 of Fig. 1;

Fig. 5 is a perspective view of one of the sliding connectors;

Fig. 6 is a side elevation of the opposed hook members which are pivotally connected to the sliding connectors;

Fig. 7 is an end elevation of the hook members, and

Fig. 8 is a transverse section taken on the line 8—8 of Fig. 6.

Figure 1:
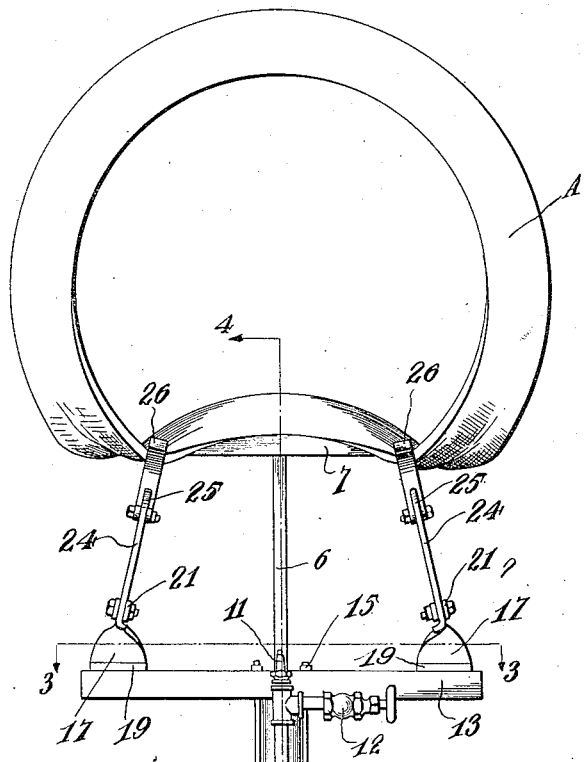
Fig. 1 is a side elevation of a tire clamping and turning device constructed in accordance with my invention, illustrating a tire arranged in position thereon and a portion of its interior exposed.

A frame structure adapted to be fixedly supported upon any suitable floor or other foundation comprises a base member 1 having secured to the upper face thereof a plate 2, said base member having, preferably, a central space 3 beneath the plate 2. Mounted upon the plate 2, over the space 3, is a guide member comprising, in the embodiment shown, a cylinder 4. Secured to the cylinder 4, preferably at the top thereof, is a transverse supporting member or bar consisting, preferably, of a channel iron 13 disposed with its flanges extending downward and secured on top of the cylinder by stay rods 14 the lower ends of which are anchored to the plate 2 while the upper ends project through the web of the iron 13 and receive nuts 15.

Within the cylinder 4 is a piston 5 to which is connected a suitable rod 6 extending upward through the member 13, guided snugly through said member and through the head of the cylinder. On the upper end of the rod 6 there may be a removable mandrel or contact block 7 which, as shown, is convexly curved longitudinally and transversely thereof, said block being of greater dimension in one direction than in the other, by preference, in order to permit exposing a considerable interior surface of a tire casing. Plate 2 has a central opening 8 to which is connected a pipe 9 which in turn is joined to any suitable source of air or gas pressure by means of which the piston 5 may be lifted within the cylinder in order to raise the block 7. In the preferred embodiment the pipe 9 is connected with an upright pipe 10 having an inflating valve 11 at the upper end which may be connected to any suitable source of air under pressure. In order to control the pressure of the air within the cylinder 4, a valve member 12 is arranged adjacent the inflating valve 11 whereby pressure may be admitted into the cylinder 4. When the valve 12 is open the air pressure is released allowing piston 5 to descend. The valve 11 is a standard inflating valve which automatically holds the air in the cylinder. The valve 12 is a suitably hand-operated release valve.

The channel iron 13 is provided at each end with a central longitudinal slot 16 in which the connecting members 17 are movably arranged. These connecting members comprise a central web portion having angularly disposed flanges 18 formed at one edge and provided with additional flanges 19 arranged in parallel spaced relation with the flanges 18 whereby a portion of the web body will be arranged within the slot 16 and the flanges 18 and 19 disposed upon opposite faces of the intermediate portion of the angular member 13 so that the member 17 will be mounted for sliding movement within the slot 16 and securely held against any lateral or tilting movement.

Figure 2:
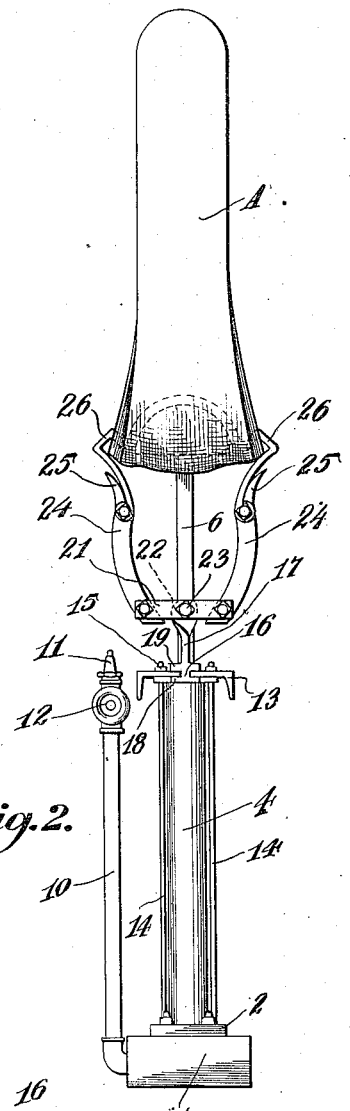
Fig. 2 is an end elevation.
Figure 3:
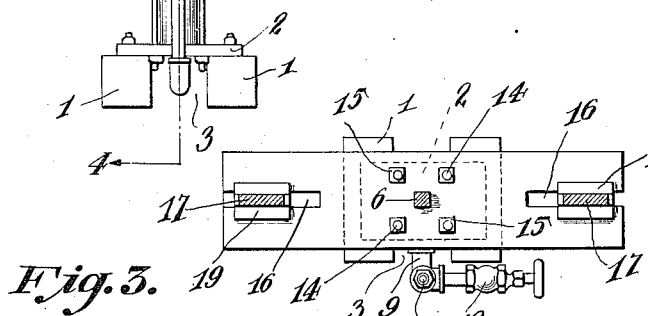
Fig. 3 is a transverse section taken on the line 3—3 of Fig. 1.

The upper end of the connecting member 17 is reduced in size and disposed at right angles to the main body portion of the connector and provided with an opening 20. Connected to this transverse upper end of the body of the connector is a transverse bar 21 having a central perforation whereby the same is pivotally connected to the end 22 of the connector by means of the pivot bolt 23. It will be noted in the construction of this device that one of the connecting members is arranged at each end of the channel iron or other support 13 and the cross bars 21 are pivotally connected to the upper ends 22 of the connecting members and pivotally connected to each end of the cross bars 21 are the movable arms 24, the outer ends of which are provided with curved portions 25 and pivotally connected to the arms 24 adjacent the outer ends thereof are the hook members 26, said hook members being provided with a bearing surface adapted to bear against the curved portion 25 of the arms 24 as shown in Fig. 2, the curved portions of the arms 24 serving to support the hooks 26 in position and retain them in contact with the object with which they are engaged.

In operation, the tire casing which is generally indicated in the drawings by A is placed upon the mandrel 7 and the hook members 26 engaged over the beading of the tire casing. It will be understood that when the tire A is first placed in position upon the mandrel, the mandrel is in a lowered position and when it is desired to expose the interior of the tire casing, air pressure is admitted into the cylinder 4 through the medium of the valves 11 and 12, to force the piston 5 upwardly which in turn imparts an upward movement to the mandrel 7 forcing the interior of the tire to the position illustrated in Figs. 1 and 2 where the interior of the tire can be readily inspected and is placed in such a position that repairs can be quickly and easily made. It will be apparent that when it is desired to release the tire casing, the air pressure from the cylinder 4 is released, permitting the mandrel 7 to drop downwardly toward the channel member 13. The hook members 26 can then be readily released from the beading of the tire and the tire removed.

From the above description taken in connection with the accompanying drawings, it will be readily apparent that I have provided a very simple device, constructed of very few parts so that the same can be readily moved from place to place, whereby a tire casing can be quickly and readily turned inside out for inspection of the interior thereof or for repairing without causing any damage to the tire whatever.

I wish it to be understood that while I have shown and described certain means for admitting air pressure to the cylinder 4, I do not wish to be limited to this particular type of construction, but desire to make such changes as may fall within the scope of the claims.

I claim:

1. A device of the class described including a base member, a cylinder mounted thereon, a piston for reciprocation within the cylinder, a rod connected with the piston, a supporting block at the outer end of the piston, a supporting bar on the cylinder, means for admitting fluid under pressure to the cylinder and hook members arranged in pairs at opposite ends of the supporting bar 2. A device of the character described including a cylinder, a piston for reciprocation within the cylinder, a rod connected with the piston, a supporting block at the outer end of the rod, a supporting member upon the cylinder, connecting members movably mounted upon the supporting member, and pivoted hook members attached to the connecting members and arranged at opposite ends of the supporting block.

3. A device of the character described including a cylinder, a piston arranged within the cylinder, a rod connected with the piston, a supporting block at the outer end of the rod, means for admitting fluid pressure to the cylinder for reciprocating the piston, a supporting member upon the cylinder, connecting members movably mounted upon the supporting member, cross bars pivoted to the connecting members and hook members having pivotal connection with each end of the cross bars and arranged in pairs at opposite ends of the supporting block.

4. A device of the class described including a movable block and opposed hook members arranged in pairs at each end of the block and fluid pressure means for operating said block.

5. A device of the class described including a supporting member, connecting members movably mounted upon each end of the supporting member, cross bars pivoted to the connecting members, self-adjusting opposed hooks pivoted to the ends of the cross bars whereby the hooks are arranged in pairs at each end of the supporting member and a movable block arranged between the pairs of hook members and means for imparting movement to the block.

6. A device of the class described including a supporting member having longitudinal slots in each end thereof, connecting members movable within said slots and having spaced flanges engaging opposite sides of the supporting member, bars pivoted to the connecting members, opposed hooks pivoted to the ends of the bars and arranged in pairs at each end of the supporting member and a block movable between the pairs of hooks and means for imparting movement to the block.

7. An apparatus of the class described comprising a supporting frame, a block adapted to bear on the exterior of a tire casing, fluid pressure means adapted to move the block outward with respect to the supporting frame, and devices adapted to grasp the edges of a tire casing engaged by the block, said devices being anchored to the supporting frame.

8. An apparatus of the class described comprising a supporting frame, a block adapted to bear on the exterior of a tire casing, fluid pressure means adapted to move the block outward with respect to the supporting frame, devices adapted to grasp the edges of a tire casing engaged by the block, and means for adjustably connecting said devices to the supporting frame in such a manner that the devices may be adjusted toward or from the path of movement of the block.

In testimony whereof I affix my signature.

LEO M. EVANS.